(12) United States Patent
Joo et al.

(10) Patent No.: US 12,481,424 B2
(45) Date of Patent: Nov. 25, 2025

(54) SYSTEM, METHOD AND COMPUTER-READABLE STORAGE MEDIUM FOR DIRECT MEMORY ACCESSES

(71) Applicant: Samsung Electronics Co., Ltd., Suwon-si (KR)

(72) Inventors: Younghwan Joo, Suwon-si (KR); Venkata Rama Krishna Meka, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 234 days.

(21) Appl. No.: 18/162,836

(22) Filed: Feb. 1, 2023

(65) Prior Publication Data

US 2023/0266879 A1   Aug. 24, 2023

(30) Foreign Application Priority Data

Feb. 18, 2022 (KR) .................. 10-2022-0021731
Apr. 1, 2022 (KR) .................. 10-2022-0041334

(51) Int. Cl.
*G06F 3/06* (2006.01)

(52) U.S. Cl.
CPC ............ *G06F 3/061* (2013.01); *G06F 3/0659* (2013.01); *G06F 3/067* (2013.01)

(58) Field of Classification Search
CPC ......... G06F 3/061; G06F 3/0659; G06F 3/067
See application file for complete search history.

(56) References Cited

U.S. PATENT DOCUMENTS

| | | | |
|---|---|---|---|
| 8,458,377 B2 | 6/2013 | Piccirillo et al. | |
| 9,092,426 B1* | 7/2015 | Bathija | ............... G06F 12/1081 |
| 9,552,619 B2 | 1/2017 | Iwai et al. | |
| 10,353,088 B1* | 7/2019 | Nelson | ...................... G01T 3/00 |
| 10,672,098 B1* | 6/2020 | Chemparathy | .......... G09G 5/39 |
| 2005/0223131 A1 | 10/2005 | Goekjian et al. | |
| 2012/0303842 A1* | 11/2012 | Cardinell | ................ G06F 13/28 |
| | | | 710/22 |
| 2022/0012201 A1* | 1/2022 | Schaub | ................... G06F 13/28 |

FOREIGN PATENT DOCUMENTS

| | | |
|---|---|---|
| JP | 2005-321842 A | 11/2005 |
| JP | 4895394 B2 | 3/2012 |
| KR | 1996-0013810 B1 | 10/1996 |
| KR | 10-2005-0004997 A | 1/2005 |

* cited by examiner

*Primary Examiner* — Eric T Oberly
(74) *Attorney, Agent, or Firm* — Harness, Dickey & Pierce, P.L.C.

(57) ABSTRACT

Provided is a system including a memory, a device including a plurality of direct memory accesses (DMAs), each of the plurality of DMAs configured to read from or write to the memory, and at least one processor configured to control the device by executing a program, wherein executing the program includes implementing a kernel configured to abstract the plurality of DMAs into a node, and an application configured to be executed on the kernel and access the device through the node.

14 Claims, 11 Drawing Sheets

```
<<struct>>
is_frame
..............................................................
-out_node[MAX_OUT_LOGICAL_NODE]
-cap_node[MAX_CAP_LOGICAL_NODE]
```

| <<struct>> |
| is_sub_node |
| -hw_id: u32
-strame[CAPTURE_NODE_MAX] |

| <<struct>> is_sub_frame |
|---|
| -id: u32<br>-num_planes: u32 |
| -kva[IS_MAX_PLANES]: ulong<br>-dva[IS_MAX_PLANES]: dma_addr_t |

SYSTEM, METHOD AND COMPUTER-READABLE STORAGE MEDIUM FOR DIRECT MEMORY ACCESSES

CROSS-REFERENCE TO RELATED APPLICATIONS

This application is based on and claims priority under 35 U.S.C. § 119 to Korean Patent Application No. 10-2022-0021731, filed on Feb. 18, 2022, in the Korean Intellectual Property Office and Korean Patent Application No. 10-2022-0041334, filed on Apr. 1, 2022, in the Korean Intellectual Property Office, the disclosures of which are incorporated by reference herein in their entireties.

BACKGROUND

Direct memory access (DMA) is a technology for directly transmitting data between a memory and another memory or between a memory and an input/output device. DMA does not require intervention from a central processing unit (CPU).

SUMMARY

Some example embodiments provide a system, a method, and a non-transitory computer-readable system which reduce software complexity of a device including a plurality of direct memory accesses (DMAs).

Some example embodiments p.

According to an example embodiment of the inventive concepts, there is provided a system including a memory, a device including a plurality of direct memory accesses (DMAs), each of the plurality of DMAs configured to read from or write to the memory, and at least one processor configured to control the device by executing a program, wherein executing the program includes implementing a kernel configured to abstract the plurality of DMAs into a node, and an application configured to be executed on the kernel and access the device through the node.

According to another example embodiment of the inventive concept, there is provided a method performed by at least one processor by executing a program, the method including providing, by a kernel implemented as part of executing the program, a node abstracting a plurality of direct memory accesses (DMAs) regarding a memory included in a device, and accessing, by an application implemented as part of executing the program, the device via the node.

According to another example embodiment of the inventive concepts, there is provided a non-transitory computer readable recording medium having stored thereon a program to be executed by at least one processor, wherein, when the program is executed by at least one processor, the program performs method in which the at least one processor controls a device including a plurality of direct memory accesses (DMAs), each of the plurality of DMAs configured to read from or write to a memory, and the method of controlling the device includes providing, by a kernel implemented as part of executing the program, a node in which the plurality of DMAs are abstracted, and accessing, by an application implemented as part of executing the program, the device through the node.

BRIEF DESCRIPTION OF THE DRAWINGS

Example embodiments of the inventive concepts will be more clearly understood from the following detailed description taken in conjunction with the accompanying drawings in which:

FIG. 6A is a diagram showing a first frame according to some example embodiments;

FIG. 6B is a diagram showing a second frame according to some example embodiments;

FIG. 6C is a diagram showing a third frame according to some example embodiments;

DETAILED DESCRIPTION OF THE EXAMPLE EMBODIMENTS

Figure 1:
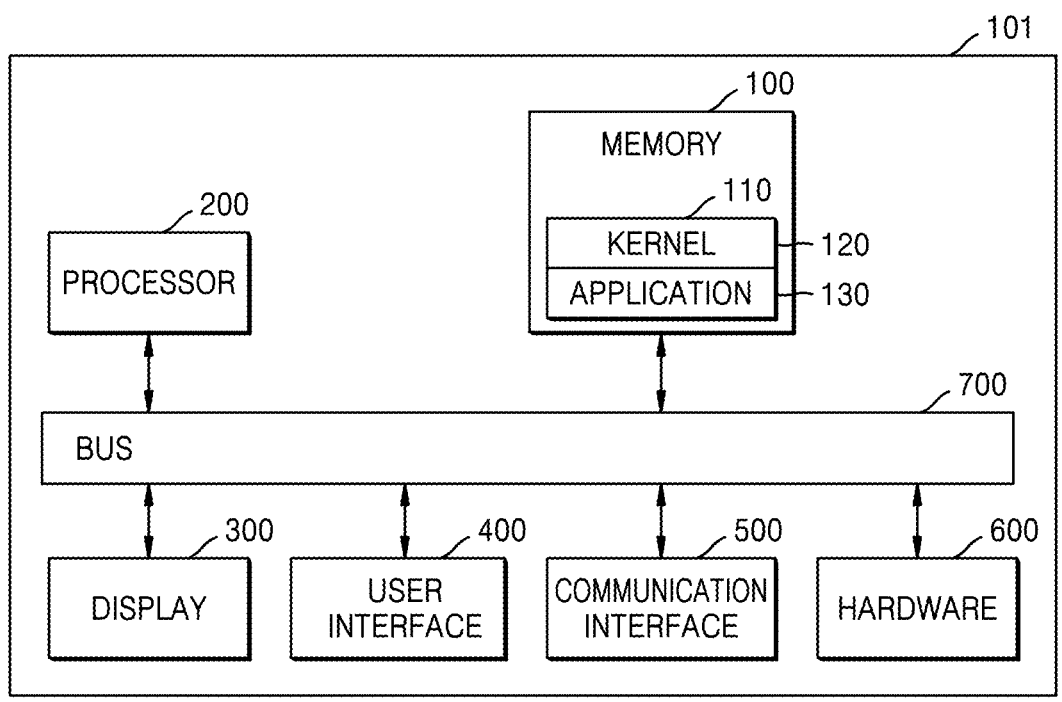
FIG. 1 is a diagram showing a system according to some example embodiments.

FIG. 1 is a diagram showing a system 101 according to some example embodiments.

The system 101 may include a memory 100, a processor 200, a display 300, a user interface 400, a communication interface 500, hardware 600, and a bus 700. According to some example embodiments, the system 101 may omit at least one of the components, that is, the memory 100, the processor 200, the display 300, the user interface 400, the communication interface 500, hardware 600, and the bus 700, or additionally include other components.

The memory 100 may include a volatile memory and/or a non-volatile memory. The memory 100 may store, for example, instructions or data related to at least one other component in the system 101. According to some example embodiments, the memory 100 may store software and/or a program 110. The program 110 may include, for example, a kernel 120 and/or an application 130. At least a part of the kernel 120 may be referred to as an operating system (OS).

The kernel 120 may, for example, control or manage system resources (e.g., a bus, a processor, a memory, etc.) used to execute an operation or a function implemented in other programs (the application 130). Also, the kernel 120 may provide an interface capable of controlling or managing system resources by accessing individual components in the system 101 to the application 130. The kernel 120 and application 130 may be implemented as part of executing a program or computer readable instructions executed by the processor 200.

According to some example embodiments, the processor 200 may control the hardware 600 by executing the program 110 in the memory 100. The kernel 120, according to some example embodiments, may abstract a plurality of direct memory accesses (DMAs) included in the hardware 600 into one node, and the application 130 may access the hardware 600 through an abstracted node. Detailed operations of the kernel 120 and the application 130, according to some example embodiments, are described below with reference to the drawings. A DMA does not require CPU intervention during data transmission to and/or from a memory. Accordingly, a CPU may perform other tasks, thereby improving the efficiency of CPU operations when a DMA can be utilized to transfer data to or from a memory.

The processor 200 may include one or more of a central processing unit (CPU), an application processor (AP), and a communication processor (CP). The processor 200 may, for example, perform operations or data processing related to controlling and/or communication of at least one other component, that is, the memory 100, the display 300, the user interface 400, the communication interface 500, hardware 600, or the bus 700, within the system 101. The processor 200 may execute the program 110 in the memory 100 to control a device within the system 101 and/or execute data processing.

The display 300 may include, for example, a liquid crystal display (LCD), a light-emitting diode (LED) display, an organic light-emitting diode (OLED) display, a micro-electro-mechanical systems (MEMS) display, or an electronic paper display. The display 300 may display, for example, various contents (e.g., texts, images, videos, icons, or symbols) to a user. The display 300 may include a touch screen, and may receive a touch input, a gesture input, a proximity input, or a hovering input using, for example, an electronic pen or a body part of a user.

The user interface 400 may serve as an interface via which commands or data input from a user or other external devices, for example, are transmitted to other component(s) in the system 101. Also, the user interface 400 may output commands or data received from other component(s) in the system 101 to a user or other external devices.

The communication interface 500 may establish communication between the system 101 and an external device (not shown), for example. For example, the communication interface 500 may be connected to a network through wireless communication or a wired communication and communicate with an external device (not shown).

The wireless communication is, for example, a cellular communication protocol and may include, for example, at least one of long-term evolution (LTE), LTE Advanced (LTE-A), code division multiple access (CDMA), wideband CDMA (WCDMA), universal mobile telecommunications system (UMTS). wireless broadband (WiBro), and global system for mobile communications (GSM). Also, the wireless communication may include, for example, short-range communication. The short-range communication may include, for example, at least one of wireless fidelity (WiFi), Bluetooth, near field communication (NFC), and global navigation satellite system (GNSS).

The network may include at least one of telecommunications networks, e.g., a computer network (e.g., LAN or WAN), the Internet, and a telephone network.

The hardware 600 may be, for example, a module capable of performing a particular function. According to some example embodiments, the hardware 600 may be a sensor module. According to some example embodiments, the hardware 600 may be a module capable of performing an image processing function. According to some example embodiments, the hardware 600 may be a power management module. Although FIG. 1 shows that only one piece of hardware 600 is provided in the system 101, the number of pieces of hardware 600 is not limited thereto. Pieces of hardware 600 may be provided according to functions needed by the system 101. In some example embodiments, the hardware 600 may be referred to as a hardware device or a device.

The bus 700 connects components 100, 200, 300, 400, 500, and 600 to one another, for example, and may include a circuit for communication (e.g., control messages and/or data) between the components 100, 200, 300, 400, 500, and 600.

According to some example embodiments, the system 101, according to t some example embodiments, may be an image processing system. The image processing system may include pieces of hardware. Pieces of hardware included in the image processing system may perform a single large function by closely interworking with one another.

According to some example embodiments, the hardware 600 may process image data stored in the memory 100 under control by at least one processor 200.

According to some example embodiments, the system 101, according to some example embodiments, may perform various image processing on an obtained image through several pieces of hardware 600, and result data thereof may be stored in the memory 100. Stored result data may be obtained by the application 130, and image displaying and photographing may be performed. The pieces of hardware 600 may interwork with one another through direct connections between the pieces of hardware 600 or may interwork with one another by exchanging data frame-by-frame through the memory 100.

Figure 2:
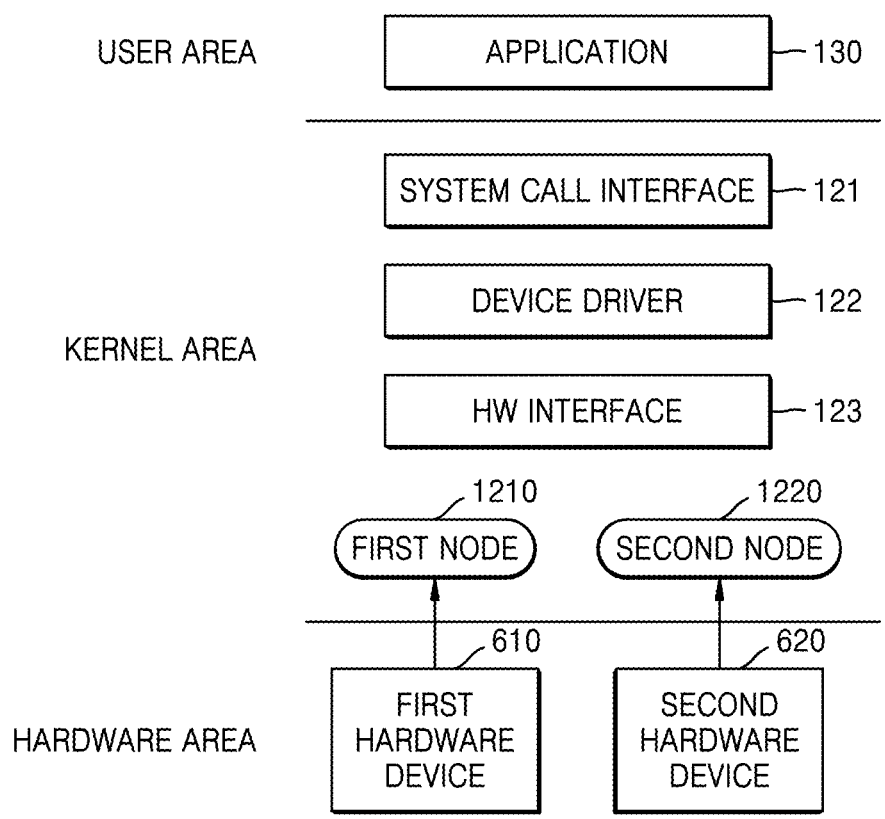
FIG. 2 is a diagram for describing an operation of a system according to some example embodiments.

FIG. 2 is a diagram for describing an operation of a system according to some example embodiments.

Referring to FIG. 2, operations in a system, according to some example embodiments, may be divided into operations performed in a user area, a kernel area, and a hardware area. An operation in the user area may be performed through the application 130, and an operation in the hardware area may be performed through each of hardware devices 610 and 620. An operation in the kernel area may be performed through a device driver 122 and a system call interface 121 and a hardware interface 123 that interconnects adjacent areas.

According to some example embodiments, as an example of a kernel, a Linux-based system may include various applications 130 and device drivers 122 each performing a particular task. For effective communication between the user area, the kernel area, and the hardware area, the user area, the kernel area, and the hardware area may often access a memory buffer (not shown). During such communication, the application 130 in the user area may transmit an application-level virtual address corresponding to application to the kernel area. A memory buffer may invoke the device driver 122 by using the application-level virtual address, and the device driver 122 may map the application-level virtual address to an OS/kernel-level virtual address.

The system call interface 121 may, for example, perform an intermediary role, such that the application 130 communicates with the kernel area and exchanges data with the kernel area.

The system call interface 121 may process one or more task requests received from the application 130 according to priority. For example, the system call interface 121 may assign priority to at least one of the applications 130 to use system resources (e.g., a bus, a processor, a memory, etc.) in the system 101.

For example, the system call interface 121 may process the one or more task requests according to the priority given to the at least one of the applications 130, thereby performing scheduling or load balancing for the one or more task requests.

A connection between the kernel area and the hardware area may be generated by a DMA. By using a DMA, hardware devices 610 and 620 may transmit data from/to a computer's main memory without CPU intervention. For DMA to work, memory buffers may be frequently mapped to a range of addresses recognizable by the hardware devices 610 and 620. The range of addresses may be referred to as IO virtual addresses. This may include setting up translations between IO virtual addresses and physical addresses of the computer's main memory, depending on the architecture. The hardware interface 123 may perform an intermediary role, such that the hardware devices 610 and 620 communicate with the kernel area and exchange data with the kernel area.

According to some example embodiments, as described below with reference to FIG. 3, the hardware devices 610 and 620 may each include a plurality of DMAs. A plurality of DMAs included in the hardware devices 610 and 620 may be abstracted into one node 1210 and 1220, respectively. Referring to FIG. 2, a plurality of DMAs included in the first hardware device 610 in the hardware region may be abstracted to the first node 1210. A plurality of DMAs included in a second hardware device 620 in the hardware region may be abstracted to the second node 1220. The first node 1210 and the second node 1220 may be abstracted in the kernel region.

The first node 1210 may include information regarding the plurality of DMAs included in the first hardware device 610. The second node 1220 may include information regarding the plurality of DMAs included in the second hardware device 620. The application 130 included in the user area may access the first hardware device 610 and the second hardware device 620 through the first node 1210 and the second node 1220, respectively.

According to some example embodiments, because the application 130 may access hardware including a plurality of DMAs through one node, the number of system calls may be reduced.

A more detailed configuration of a node is described below with reference to the drawings.

Figure 3:
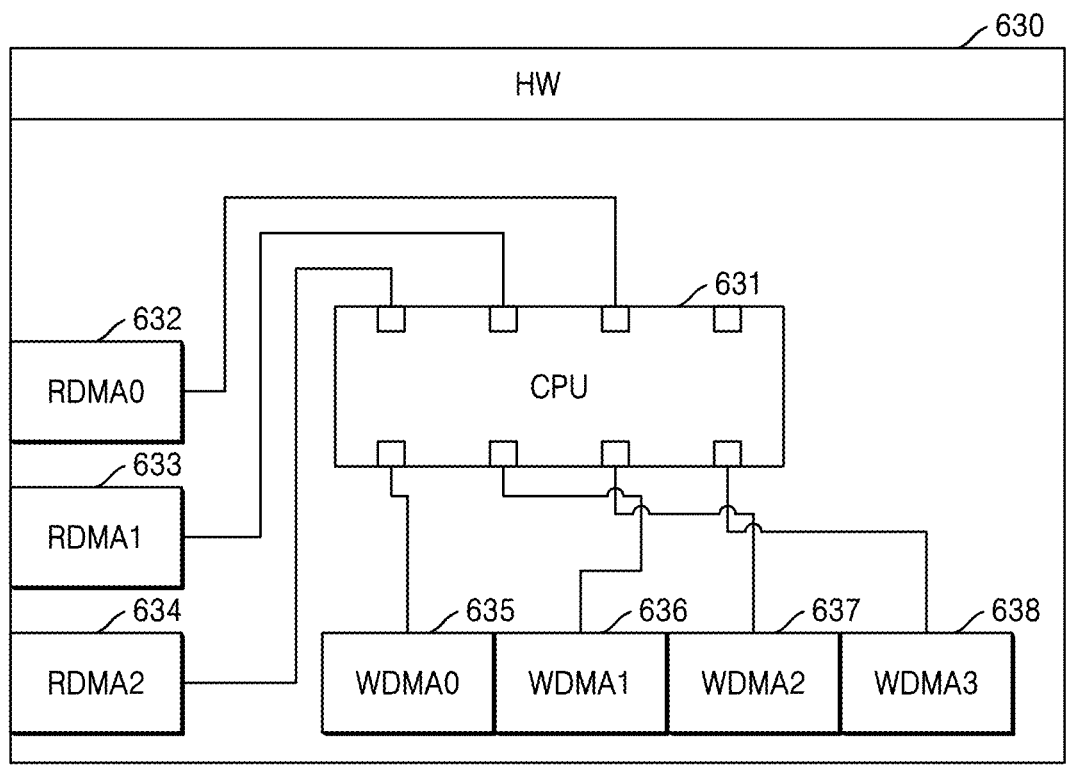
FIG. 3 is a diagram showing hardware according to some example embodiments.

FIG. 3 is a diagram showing hardware according to some example embodiments.

Referring to FIG. 3, a CPU 631 and a plurality of DMAs 632 to 638 included in hardware 630, according to some example embodiments, are shown. The hardware 630 shown in FIG. 3 may correspond to the hardware 600 in the system 101 of FIG. 1.

Referring to FIG. 3, the hardware 630 may include the CPU 631, first to third Read DMAs (RDMAs) 632, 633, and 634, and first to fourth Write DMAs (WDMAs) 635, 636, 637, and 638. The CPU 631 may be a processor capable of controlling pieces of hardware or software components connected to the hardware 630 by driving a kernel (or an OS) or an application and performing various data processing and operations. The first to third RDMAs 632, 633, and 634 may be DMAs related to data input to the hardware 630. The first to fourth WDMAs 635, 636, 637, and 638 may be DMAs related to data output from the hardware 630. The first to third RDMAs 632, 633, and 634 may be connected to the CPU 631 in the hardware 630. The first to fourth WDMAs 635, 636, 637, and 638 may be connected to the CPU 631 in the hardware 630. A plurality of inputs and a plurality of outputs may be provided for the hardware 630, and the hardware 630 may be provided in a structure having a plurality of DMAs respectively corresponding to the plurality of inputs and the plurality of outputs.

According to FIG. 3, an example embodiment in which three RDMAs 632, 633, and 634 and four WDMAs 635, 636, 637, and 638 are included in the hardware 630 is shown. Referring to FIG. 3, an example embodiment in which the hardware 630 includes 7 DMAs is shown. The number of DMAs that the hardware 630 may include is not limited to that of the example embodiment of FIG. 3, and the hardware 630 may include n DMAs. In this case, n may be 2 or a greater natural number.

Figure 4A:
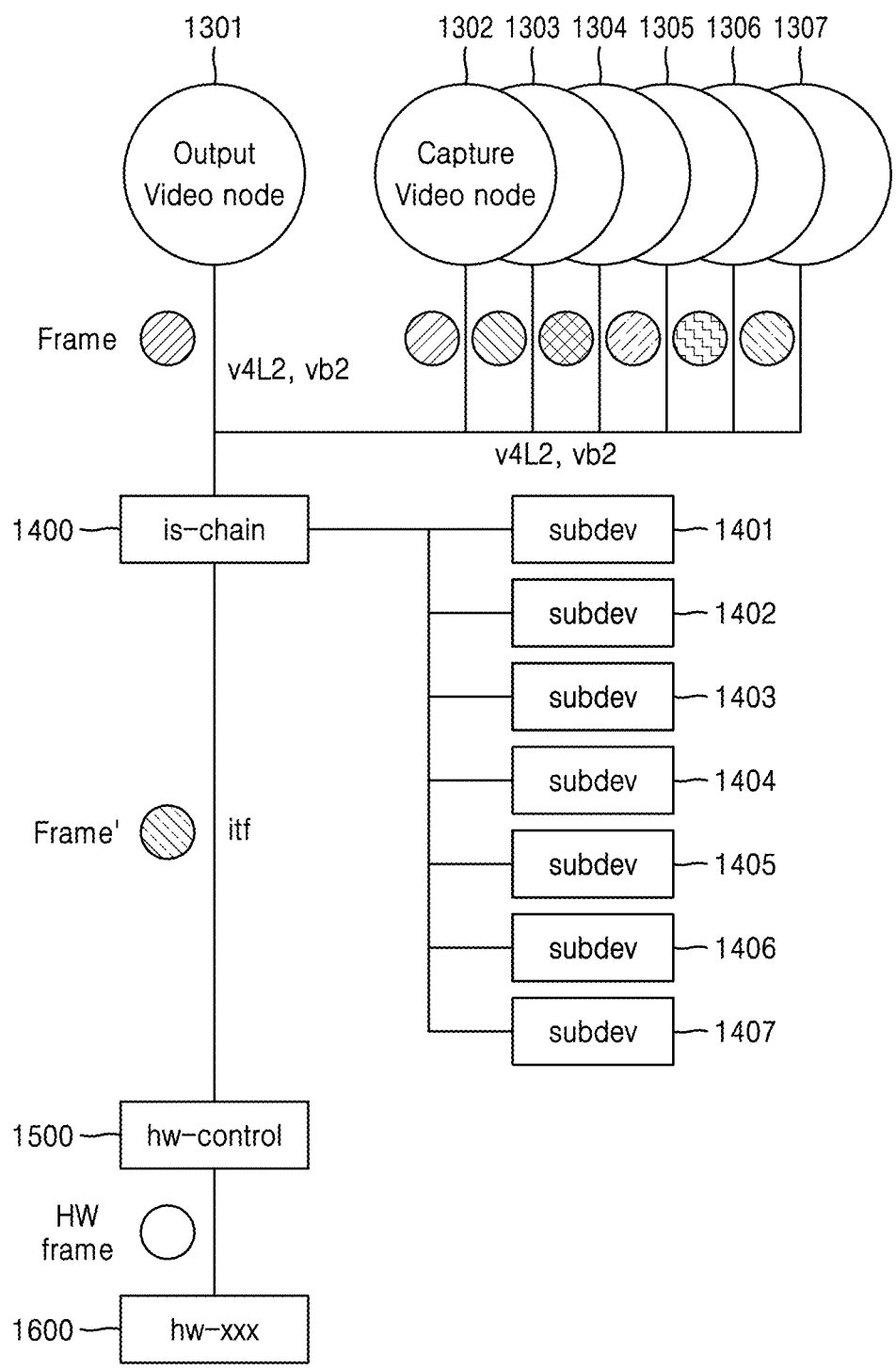
FIG. 4A is a diagram showing an example of a data processing method of a plurality of direct memory accesses (DMAs) according to a comparative example.

FIG. 4A is a diagram showing an example of a data processing method of a plurality of DMAs according to a comparative example. FIG. 4A is a diagram schematically showing a DMA processing method in a kernel area.

Referring to FIG. 4A, one output video node 1301 and six capture video nodes 1302 to 1307 are shown. In the example of FIG. 4A, each of a plurality of DMAs included in hardware is treated as one node. Also, a memory buffer may be obtained by using an interface defined by the V4L2 framework implemented in Linux, and an application may read data through an RDMA (input) of FIG. 3 or store data through a WDMA (output).

Referring to FIGS. 3 and 4A, an RDMA in hardware may read data from a memory, and, in terms of hardware, the RDMA obtains data, and thus, the RDMA may be referred to as a capture video node. On the contrary, a WDMA in hardware outputs data (e.g., writes data) in terms of hardware, and thus, the WDMA may be referred to as an output video node. Restated, the RDMAs and WDMAs may be DMAs which are connected to the memory 100 and each of the DMAs may be configured to read or write to the memory 100.

In terms of software, a bundle of such nodes may be referred to as a chain. An is-chain 1400 shown in FIG. 4A may correspond to a block abstracting connection between a plurality of nodes in a system. Nodes 1301 to 1307 included in the is-chain 1400 may be abstracted into sub devices (subdev) 1401 to 1407 and operate. Therefore, a set of a plurality of abstracted subdevs 1401 to 1407 may be disclosed in the is-chain 1400. There are a plurality of nodes belonging to each subdev, and, by using this, a memory buffer may be provided and a buffer in which data is stored may be obtained and used.

The subdevs 1401 to 1407 shown in FIG. 4A may be abstracted and provided to use the V4L2 framework implemented in the Linux kernel. The subdevs 1401 to 1407 may be logic for controlling a sub node corresponding to each DMA in hardware.

Referring to FIG. 4A, since there are a plurality of subdevs 1401 to 1407, and there are many nodes 1301 to 1307 belonging to each of the subdevs 1401 to 1407, it is necessary to control dozens of nodes to perform an operation of hardware including the dozens of nodes. Therefore, software complexity is proportionally increased because dozens of nodes need to be controlled.

Figure 7:
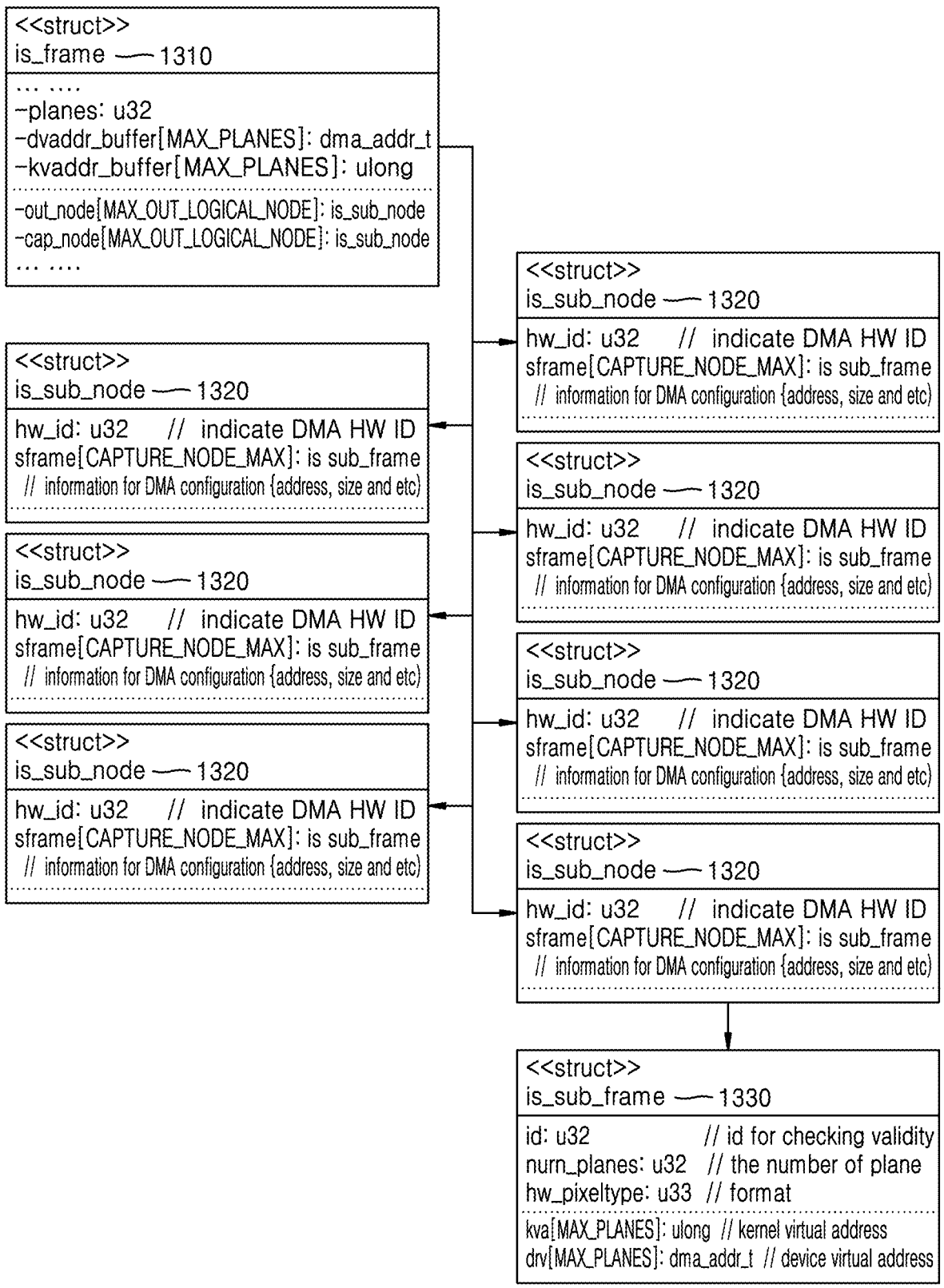
FIG. 7 is a diagram showing a connection relationship between a first frame, a second frame, and a third frame according to some example embodiments.

Referring to FIG. 4A, 7 video nodes having 7 subdev structures may be generated to control hardware including 7 DMAs, and 7 frame structures is_frame may be generated and processed in correspondence thereto.

Referring to FIG. 4A, when a software node is generated for each DMA and used as a means for communicating with an upper layer, for example, in a Linux OS, a V4L2 video node may be generated and operated for each DMA. An application may receive various pieces of information like a buffer of each node and the size constituting of the buffer from an upper layer and perform hardware setting. The upper layer may generate a final result by operating pieces of hardware. The upper layer may transmit a buffer by using a plurality of nodes for each piece of hardware. Referring to FIG. 4A, as the number of DMAs included in hardware increases, the number of nodes increases, and thus, software overhead increases due to an increase in code complexity and an increase in system calls.

According to some example embodiments, a plurality of nodes shown in FIG. 4A may be grouped into one abstract node and controlled. Detailed descriptions thereof are given below with reference to FIG. 4B.

Figure 4B:
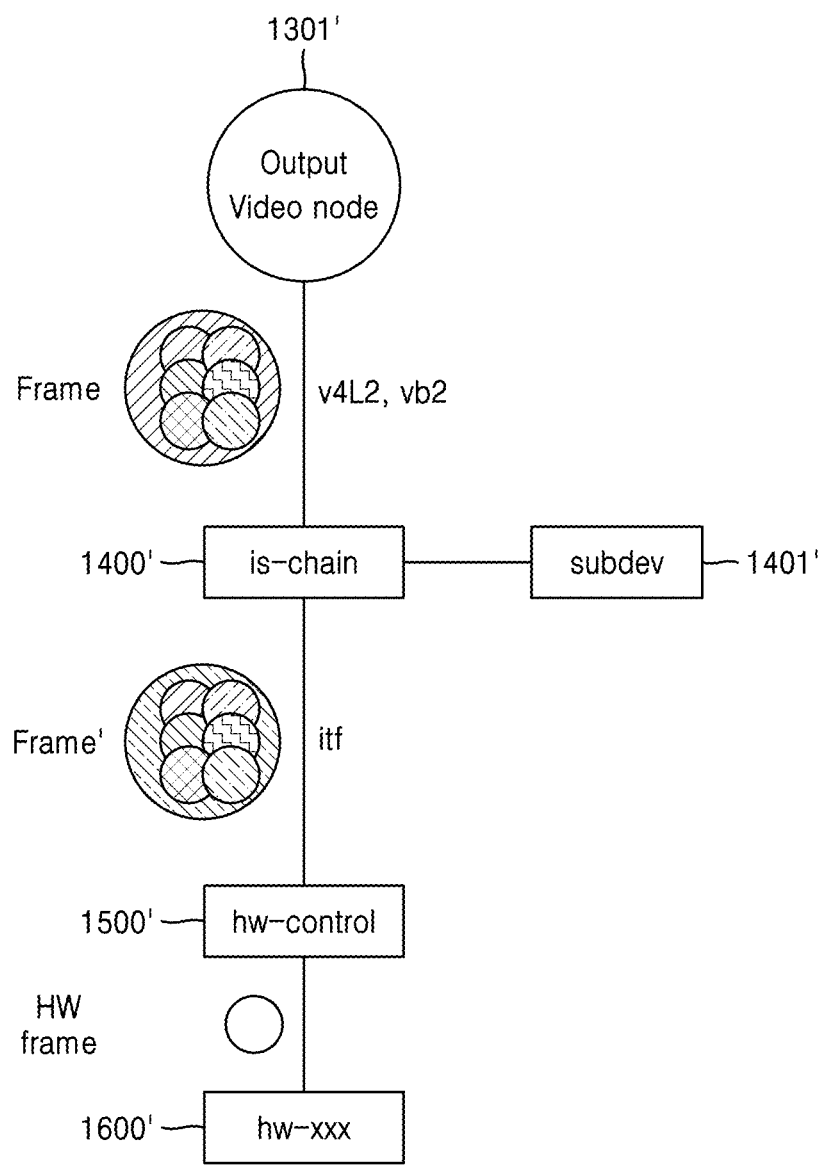
FIG. 4B is a diagram showing an example of a data processing method of a plurality of DMAs according to some example embodiments.

FIG. 4B is a diagram showing an example of a data processing method of a plurality of DMAs according to some example embodiments.

For convenience of explanation, the data processing method of FIG. 4B is described in comparison with that of FIG. 4A.

Referring to FIG. 4B, a process in which a single node 1301' abstracting a plurality of DMAs is used is shown. Compared with FIG. 4A, in FIG. 4A, the nodes 1301 to 1307 respectively corresponding to a plurality of DMAs are indicated by circles having the same size. However, in FIG. 4B, circles corresponding to nodes respectively corresponding to a plurality of DMAs are merged into one.

According to some example embodiments, in the abstracted single node 1301', the circle having the largest size may indicate is_frame for a master node. A kernel, according to some example embodiments, may operate the hardware 1600' based on a frame transmitted to the abstracted single node 1301'. According to some example embodiments, information regarding sub_nodes may be aggregated and transmitted in is_frame. In other words, an application may transfer the setting data of a plurality of DMAs at once. Referring to FIG. 4B, a buffer and buffer information for operations of a plurality of DMAs may be transferred through the abstracted single node 1301'.

In some example embodiments, a plurality of DMAs may be operated as one abstracted node by using the abstracted single node 1301' per hardware. According to some example embodiments, V4L2 video nodes may be abstracted one-by-one per hardware device rather than per DMA. Also, a buffer and buffer information against a plurality of DMAs may be transferred to one video node at once. Upper software may control all (or alternatively, at least one of the) DMAs through one node instead of a plurality of nodes.

The abstracted single node 1301', which is an output video node, has information corresponding to a plurality of DMAs, may transfer the information to is-chain 1400' at once, and control the hardware 1600' by using the transferred data. In other words, the hardware 1600' may be controlled by receiving aggregated frame information from one representative virtual node, that is, the abstracted single node 1301', and utilizing the aggregated frame information as information regarding a plurality of sub-nodes against each DMA.

According to some example embodiments, the number of system calls may be reduced, and data needed for setting a plurality of DMAs needed for operations of hardware may be efficiently managed.

Figure 5:
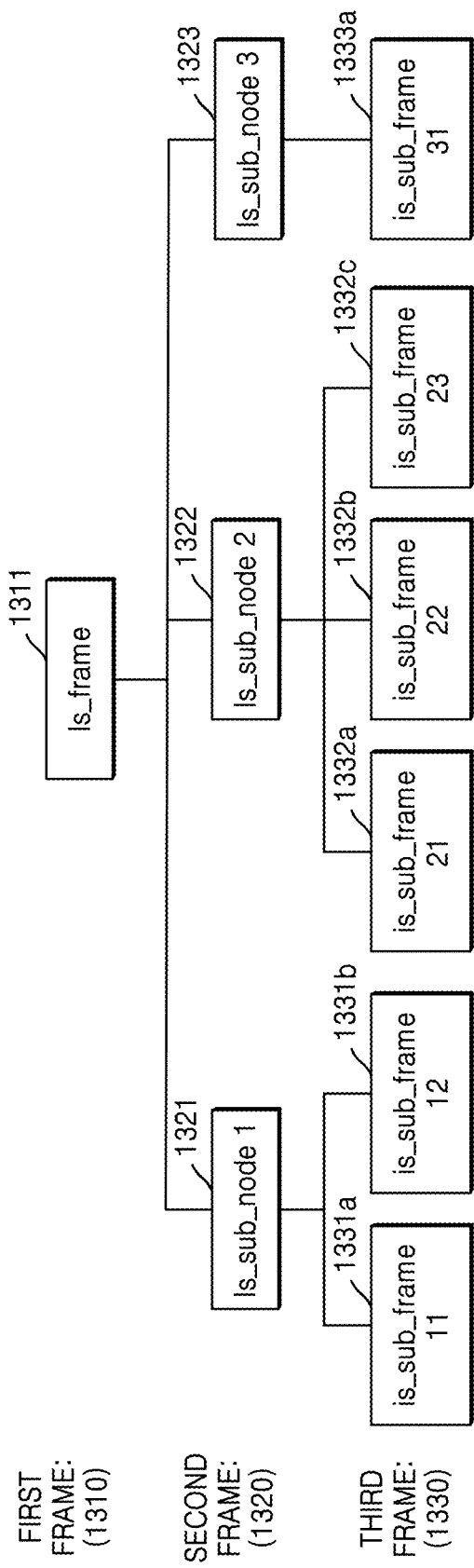
FIG. 5 is a diagram for describing frames included in a node according to some example embodiments.

FIG. 5 is a diagram for describing frames included in a node according to some example embodiment.

A node, according to some example embodiments, may include a first frame 1310, a second frame 1320, and a third frame 1330. Referring to FIG. 5, the first frame 1310 may correspond to is_frame 1311. The second frame 1320 may correspond to is_sub_nodes 1321, 1322, and 1323. The third frame 1330 may correspond to is_sub_frames 1331a to 1333a. Names of frames corresponding to the first frame 1310, the second frame 1320, and the third frame 1330 may be different from those shown in FIG. 5. Hereinafter, for convenience of explanation, it is assumed that names of frames corresponding to the first frame 1310, the second frame 1320, and the third frame 1330 are the same as those shown in FIG. 5.

According to some example embodiments, the first frame 1310 may be an upper frame of the second frame 1320. The second frame 1320 may be an upper frame of the third frame 1330. Information included in the first frame 1310 may be a higher concept of the second frame 1320. Information included in the second frame 1320 may be a higher concept of the third frame 1330. Detailed descriptions thereof are given below.

Information included in the first frame 1310, the second frame 1320, and the third frame 1330 may be different from one another. A node 1301, according to some example embodiments, may include the first frame 1310 accessed by an application, a plurality of second frames 1320 respectively corresponding to a plurality of DMAs, and a plurality of third frames 1330 respectively including information regarding buffers accessed by the plurality of DMAs.

The first frame 1310 may be a structure containing all (or alternatively, at least one of the) settings regarding a result frame output by an operation of hardware. According to some example embodiments, the first frame 1310 may include setting information needed for operations of a plurality of DMAs. For one hardware device, one first frame 1310 may be provided.

The second frame 1320 may be a structure including buffer information regarding DMAs belonging to hardware. According to some example embodiments, the buffer information may include an address, a size, a format, etc. The second frame 1320 may include ID information regarding hardware including a plurality of DMAs. According to some example embodiments, each DMA may be identified by an ID.

According to some example embodiments, the number of second frames 1320 may be the same as the number of DMAs included in hardware. Referring to FIG. 3, the number of DMAs included in the hardware 630 is 7. In the hardware 630 according to the example embodiment of FIG. 3, 7 second frames 1320 may be provided, which is the same as the number of DMAs included in the hardware 630.

The third frame 1330 may be a structure containing detailed information regarding a buffer accessed by a DMA. According to some example embodiments, detailed information regarding a buffer may include a kernel/device virtual address and the number of planes.

According to some example embodiments, according to the format of the detailed information regarding a buffer, one image may have non-continuous virtual addresses. This may be applied when hardware needs to divide a large buffer into parts and perform processing several times. For example, even in the RGB format, buffer corresponding to each of R/G/B channels may exist continuously, or separate addresses for R/G/B channels may exist.

According to some example embodiments, a plurality of third frames 1330 may be provided. Referring to FIG. 5, some example embodiments in which the third frames 1330 are provided as three third frames 1332a to 1332c, or two third frames 1331a and 1331b, or one third frame 1333a is shown.

According to some example embodiments, a plurality of third frames 1330 are provided to support a strip processing function. For example, it may be assumed that the size of an image to be processed by hardware including the first frame 1310, the second frame 1320, and the third frame 1330 is 1000. In this case, separately making hardware capable of handling the size of 1000 at once may not be cost-efficient. According to some example embodiments, hardware may be configured to process the size of 300 only, and the hardware may process the size of 1000 internally by operating 4 times. Knowing all of such hardware characteristics and dividing transferring is_frame is difficult to be controlled and debugged. Therefore, a plurality of sub-frames, that is, is_sub_frames, may be made, and operation of hardware can be repeatedly performed multiple times using the plurality of sub-frames.

According to some example embodiments, the first frame 1310 may include a plurality of pointers respectively corresponding to a plurality of the second frames 1320. The plurality of second frames 1320 may each include at least one pointer corresponding to at least one of the third frames 1330. A pointer may correspond to a register of a buffer memory to which a record to be processed needs to be input.

According to some example embodiments, to use one abstracted node, the one abstracted node may be defined as a layered data structure. The layered data structure may be named and treated as is_sub_frame. According to some example embodiments, it is possible to reduce the complexity of software and reduce timing problems that occur in controlling each node. The timing problem may refer to a case in which there is a problem in obtaining data as desired because certain node settings are omitted or a sequence of node is changed. Thus, the implementation of the kernel and application can improve the functioning of the device.

FIG. 6A is a diagram showing a first frame according to some example embodiments.

Referring to FIG. 6A, the frame name of the first frame 1310 may be is_frame. Information included in the first frame 1310 may be information regarding nodes corresponding to DMAs included in hardware. Out node[MAX OUT LOGICAL NODE] of FIG. 6A may be information regarding a node corresponding to an RDMA included in hardware. Cap node[MAX CAP LOGICAL NODE] of FIG. 6A may be information regarding a node corresponding to a WDMA included in hardware.

FIG. 6B is a diagram showing a second frame according to some example embodiments.

According to FIG. 6B, the frame name of the second frame 1320 may be is_sub_node. Information included in the second frame 1320 may be address information and size information regarding a corresponding DMA, and ID information regarding hardware including the DMA. hw_id of FIG. 6B indicates the ID of hardware included in a corresponding DMA. In the example embodiment of FIG. 6B, the ID of the hardware is u32. Strame[CAPTURE_NODE_MAX] may be configuration information regarding a corresponding DMA. For example, Strame[CAPTURE_NODE_MAX] may be information like an address and the size of the corresponding DMA.

FIG. 6C is a diagram showing a third frame according to some example embodiment.

According to FIG. 6C, the frame name of the third frame 1330 may be is_sub_frame. Information included in the third frame 1330 may be virtual address information regarding a buffer to be accessed by a DMA. id and num_plane of FIG. 6C may be information for confirming the ID of hardware for authenticity confirmation and information indicating the number of planes. kva[IS_MAX_PLANES] may be a virtual address of a kernel to be accessed by the corresponding DMA, and Dva[IS_MAX_PLANES] may be a virtual address of a device to be accessed by the corresponding DMA.

FIGS. 6A to 6C only show examples of the first frame 1310, the second frame 1320, and the third frame 1330, and detailed configurations that the first frame 1310, the second frame 1320, and the third frame 1330 may be different from those shown in FIGS. 6A to 6A.

FIG. 7 is a diagram showing a connection relationship between a first frame, a second frame, and a third frame according to some example embodiments.

When data is processed by using a plurality of nodes respectively corresponding to a plurality of DMAs, a hardware device may be operated by receiving a plurality of is frames. Therefore, it may be difficult to arbitrarily determine to operate hardware after which is_frame is received. According to some example embodiments, a sequence may be designated to operate hardware when an is_frame regarding a main node is received.

The first frame 1310 of FIG. 7 may include information regarding a main node and information regarding a sub node. According to some example embodiments, the main node may be a node including information for starting a hardware operation. According to some example embodiments, information regarding the main node may use information in is_frame like a method of processing data using a plurality of nodes, and information regarding additional DMAs may be abstracted to sub-nodes to transfer data.

The second frame 1320 of FIG. 7 may include ID information regarding hardware including DMAs. The second frame of FIG. 7 may include information regarding DMAs like addresses and sizes of the respective DMAs.

The third frame 1330 of FIG. 7 may include format information and information regarding the number of planes. Also, the third frame 1330 may include virtual address information regarding a kernel or a device to be accessed by a corresponding DMA.

In a system according to some example embodiments, all (or alternatively, at least one) of a plurality of DMAs included in hardware may be abstracted into one node regardless of the number of DMAs. Accordingly, one subdev may be generated, and one first frame (is_frame) 1310) for controlling the subdev may be generated. According to some example embodiments, all (or alternatively, at least one) related DMAs may be controlled through information regarding the second frame 1320 and the third frame 1330 associated with the first frame 1310.

Figure 8:
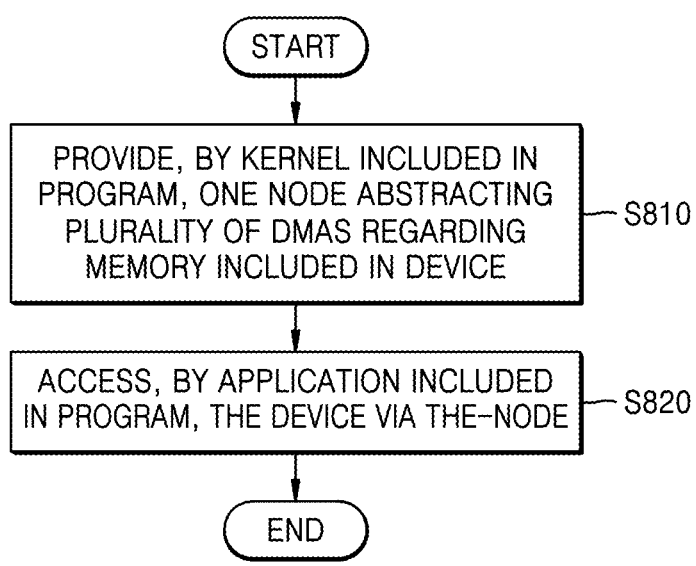
FIG. 8 is a flowchart of a method according to some example embodiments.

FIG. 8 is a flowchart of a method according to some example embodiments.

Referring to FIG. 8, a method performed by at least one processor by executing a program is shown. One node that abstracts a plurality of DMAs regarding a memory included in a device may be provided by a kernel included in a program (operation S810), and the device may be accessed by an application included in the program through the node (operation S820). Thereafter, the method may be terminated.

According to some example embodiments, a technique for performing software abstraction in a kernel for a plurality of DMAs is provided. This may be performed by using a logical video node (LVN). According to some example embodiments, for the purpose of controlling a plurality of DMAs at once, software abstraction may be performed to one node.

According to some example embodiments, video nodes corresponding to input and output DMAs of each piece of hardware may be abstracted into one node. A node may define a meta data structure for receiving a plurality of pieces of DMA information. An application may control a DMA and hardware including the DMA by receiving data included in the corresponding node at once.

Various operations of the methods described above may be performed by any suitable means capable of performing the operations, such as various hardware and/or software implemented as parts of hardware (e.g., a processor, ASIC, etc.).

Software may include a sorted list of executable instructions for implementing logical functions and may be embedded in an arbitrary "processor-readable medium" to be used by or in association with an instruction execution system, apparatus, or device, such as a single or multi-core processor or a processor-containing system.

As used herein, the term "storage medium", "computer readable storage medium" or "non-transitory computer readable storage medium" may refer to one or more devices for storing data including, for example, ROMs, RAMs, MRAMs, core memories, magnetic disk storage media, optical storage media, flash memory devices, and/or devices including other tangible machine-readable media for storing information. The "computer-readable medium" may include, as non-limiting examples, portable or stationary storage devices, optical storage devices, or various other media capable of storing, containing, or transporting instruction(s) and/or data.

Moreover, example embodiments may be implemented in hardware, software, firmware, middleware, microcode, hardware description languages (HDL), or any combination thereof. When implemented in software, firmware, middleware, or microcode, program code, or code segments for performing necessary tasks may be stored in a machine or computer-readable medium like a computer-readable storage medium. When implemented in software, a processor or processors may be programmed to perform necessary tasks, thereby being converted into a processor(s) or a computer(s) for a particular purpose.

Any of the elements and/or functional blocks disclosed above may include or be implemented in processing circuitry such as hardware including logic circuits; a hardware/software combination such as a processor executing software; or a combination thereof. For example, the processor 200 and CPU 631 may be implemented as processing circuitry. The processing circuitry specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

While the inventive concepts have been particularly shown and described with reference to example embodiments thereof, it will be understood that various changes in form and details may be made therein without departing from the spirit and scope of the following claims.

What is claimed is:

1. A system comprising:
   a memory;
   a device comprising a plurality of direct memory accesses (DMAs), each DMA of the plurality of DMAs configured to read from or write to the memory; and
   at least one processor configured to control the device by executing a program, wherein executing the program includes implementing,
      a kernel configured to abstract the plurality of DMAs into a node; and
      an application configured to be executed on the kernel and access the device through the node, wherein the node comprises,
         a first frame accessed by the application,
         a plurality of second frames corresponding to the plurality of DMAs, and
         a plurality of third frames comprising information regarding buffers accessed by the plurality of DMAs, respectively.

2. The system of claim 1, wherein
   the first frame comprises a plurality of pointers respectively corresponding to the plurality of second frames, and
   the plurality of second frames each comprise at least one pointer corresponding to at least one of the plurality of third frames.

3. The system of claim 1, wherein the first frame comprises setting information regarding a result frame output by an operation of the device.

4. The system of claim 1, wherein the plurality of second frames comprise information regarding addresses and sizes of the plurality of DMAs or ID information of hardware, the ID information of the hardware including the ID information of the plurality of DMAs.

5. The system of claim 1, wherein the plurality of third frames comprise an address of a buffer accessed for operations of the plurality of DMAs.

6. The system of claim 1, wherein the device is configured to process image data stored in the memory under control by the at least one processor.

7. A method performed by at least one processor by executing a program, the method comprising:
   providing, by a kernel implemented as part of executing the program, a node abstracting a plurality of direct memory accesses (DMAs), each DMA of the plurality of DMAs configured to read from or write to a memory included in a device; and
   accessing, by an application implemented as part of executing the program, the device via the node, wherein the node comprises,
      a first frame accessed by the application,
      a plurality of second frames corresponding to the plurality of DMAs, and
      a plurality of third frames comprising information regarding buffers accessed by the plurality of DMAs, respectively.

8. The method of claim 7, wherein the first frame comprises a plurality of pointers respectively corresponding to the plurality of second frames, and
   the plurality of second frames each comprise at least one pointer corresponding to at least one of the plurality of third frames.

9. The method of claim 7, wherein the first frame comprises setting information regarding a result frame output by an operation of the device.

10. The method of claim 7, wherein the plurality of second frames comprise information regarding addresses and sizes of the plurality of DMAs or ID information of hardware, the ID information of the hardware including the ID information of the plurality of DMAs.

11. The method of claim 7, wherein the plurality of third frames comprise an address of a buffer accessed for operations of the plurality of DMAs.

12. The method of claim 7, wherein the device is configured to process image data stored in the memory under control by the at least one processor.

13. A non-transitory computer readable recording medium having stored thereon a program to be executed by at least one processor, wherein, when the program is executed by the at least one processor, the program performs a method in which the at least one processor controls a device comprising a plurality of direct memory accesses (DMAs), each DMA of the plurality of DMAs configured to read from or write to a memory, and the method of controlling the device comprising:

providing, by a kernel implemented as part of executing the program, a node in which the plurality of DMAs are abstracted; and accessing, by an application implemented as part of executing the program, the device through the node, wherein the node comprises, a first frame accessed by the application, a plurality of second frames corresponding to the plurality of DMAs, and a plurality of third frames comprising information regarding buffers accessed by the plurality of DMAs, respectively.

14. The non-transitory computer readable recording medium of claim 13, wherein the first frame comprises a plurality of pointers respectively corresponding to the plurality of second frames, and the plurality of second frames each comprise at least one pointer corresponding to at least one of the plurality of third frames.

* * * * *